(12) United States Patent
Chamberlin et al.

(10) Patent No.: US 10,851,845 B2
(45) Date of Patent: Dec. 1, 2020

(54) CLUTCH AND ELECTRIC MOTOR

(71) Applicant: BorgWarner Inc., Auburn Hills, MI (US)

(72) Inventors: Bradley Duane Chamberlin, Pendleton, IN (US); Sven Norbert Altlay, Friesenheim (DE); Jomon Kaniampalackal, Hockenheim (DE); Clemens Burger, Nobelsville, IN (US)

(73) Assignee: BORGWARNER INC., Auburn Hills, MI (US)

( * ) Notice: Subject to any disclaimer, the term of this patent is extended or adjusted under 35 U.S.C. 154(b) by 119 days.

(21) Appl. No.: 15/455,576

(22) Filed: Mar. 10, 2017

(65) Prior Publication Data
US 2017/0261045 A1 Sep. 14, 2017

Related U.S. Application Data

(60) Provisional application No. 62/307,130, filed on Mar. 11, 2016.

(51) Int. Cl.
*F16D 13/72* (2006.01)
*F16D 25/10* (2006.01)
(Continued)

(52) U.S. Cl.
CPC .............. *F16D 13/72* (2013.01); *B60K 6/26* (2013.01); *B60K 6/387* (2013.01); *F16D 13/52* (2013.01);
(Continued)

(58) Field of Classification Search
CPC .......... F16D 13/72; F16D 13/52; F16D 13/74; F16D 21/00; F16D 21/06; F16D 25/0638; F16D 25/10; F16D 25/123; F16D 2021/0661; F16D 2021/0692; B60K 6/26; B60K 6/387; B60K 1/00; B60K 11/02;
(Continued)

(56) References Cited

U.S. PATENT DOCUMENTS 5,513,719 A * 5/1996 Moroto ..................... B60K 6/24
180/65.21
6,354,974 B1 * 3/2002 Kozarekar ............... B60K 6/26
180/65.21
(Continued)

FOREIGN PATENT DOCUMENTS

JP 2002211258 A 7/2002
WO 2007001736 A1 1/2007

OTHER PUBLICATIONS

DE102005040770 (Machine translation)—Reisch Mar. 2007 (Year: 2007).*

*Primary Examiner* — Tinh Dang
(74) *Attorney, Agent, or Firm* — Cantor Colburn LLP

(57) ABSTRACT

A number of variations may include a product including a stator assembly and/or a rotor assembly wherein at least one of the stator assembly and/or rotor assembly includes a central cavity, and at least two clutch assemblies, wherein at least a portion of each of the two clutch assemblies is received in the cavity. A number of variations may include a module wherein a plurality of clutches and electric motor are received in the same housing to form a module wherein the electromagnetic (motor performance and clutch performance can be tested prior to installing the module in a vehicle.

4 Claims, 3 Drawing Sheets

(51) Int. Cl.
*F16D 21/06* (2006.01)
*H02K 7/00* (2006.01)
*F16D 25/0638* (2006.01)
*F16D 25/12* (2006.01)
*B60K 6/26* (2007.10)
*B60K 6/387* (2007.10)
*F16D 13/52* (2006.01)
*F16D 13/74* (2006.01)
*F16D 21/00* (2006.01)
*H02K 7/108* (2006.01)
*H02K 9/19* (2006.01)
*B60K 11/02* (2006.01)
*B60K 1/00* (2006.01)
*B60K 6/48* (2007.10)
*B60K 6/40* (2007.10)

(52) U.S. Cl.
CPC ............ *F16D 13/74* (2013.01); *F16D 21/00* (2013.01); *F16D 21/06* (2013.01); *F16D 25/0638* (2013.01); *F16D 25/10* (2013.01); *F16D 25/123* (2013.01); *H02K 7/006* (2013.01); *H02K 7/108* (2013.01); *H02K 9/19* (2013.01); *B60K 1/00* (2013.01); *B60K 11/02* (2013.01); *B60K 2001/001* (2013.01); *B60K 2001/006* (2013.01); *B60Y 2200/92* (2013.01); *B60Y 2400/4244* (2013.01); *B60Y 2400/60* (2013.01); *F16D 2021/0661* (2013.01); *F16D 2021/0692* (2013.01); *Y10S 903/906* (2013.01); *Y10S 903/914* (2013.01)

(58) Field of Classification Search
CPC .......... B60K 2001/001; B60K 2001/06; H02K 7/006; H02K 7/108; H02K 9/19; B60Y 2200/92; B60Y 2400/4244; B60Y 2400/60; Y10S 903/906; Y10S 903/914
See application file for complete search history.

(56) References Cited

U.S. PATENT DOCUMENTS

| | | | | |
|---|---|---|---|---|
| 6,655,484 | B2 * | 12/2003 | Levin | B60K 6/22 180/65.25 |
| 7,239,055 | B2 * | 7/2007 | Burgman | B60K 6/26 310/112 |
| 7,293,637 | B2 * | 11/2007 | Janson | B60K 6/48 180/65.25 |
| 7,339,300 | B2 * | 3/2008 | Burgman | B60K 6/26 180/65.1 |
| 7,832,537 | B2 * | 11/2010 | Blessing | B60K 6/387 192/48.611 |
| 8,274,186 | B2 * | 9/2012 | Blessing | B60K 6/26 310/61 |
| 8,453,817 | B2 * | 6/2013 | Schrage | B60K 6/26 192/48.611 |
| 8,636,091 | B2 * | 1/2014 | Sanji | B60K 6/26 180/65.23 |
| 8,991,576 | B2 * | 3/2015 | Sperrfechter | F16H 45/02 192/3.26 |
| 9,193,255 | B2 * | 11/2015 | Arnold | B60K 6/36 |
| 9,950,605 | B2 * | 4/2018 | Suyama | B60K 6/387 |
| 2003/0148843 | A1 | 8/2003 | Bowen | |
| 2007/0175726 | A1 * | 8/2007 | Combes | B60K 6/40 192/48.614 |
| 2008/0047799 | A1 * | 2/2008 | Combes | B60K 6/387 192/58.5 |
| 2009/0008212 | A1 * | 1/2009 | Combes | B60K 6/387 192/113.34 |
| 2012/0013211 | A1 | 1/2012 | Chamberlin et al. | |
| 2013/0306005 | A1 | 11/2013 | Shutty et al. | |
| 2017/0203643 | A1 | 7/2017 | Suyama | |
| 2018/0236865 | B2 * | 8/2018 | Lorenz | B60K 6/387 |
| 2018/0238401 | A1 * | 8/2018 | Lorenz | F16D 25/10 |
| 2018/0245640 | A1 * | 8/2018 | Lorenz | F16D 21/06 |
| 2018/0283469 | A1 * | 10/2018 | Lorenz | F16D 21/06 |
| 2018/0313411 | A1 * | 11/2018 | Satoyoshi | F16D 25/10 |

* cited by examiner

CLUTCH AND ELECTRIC MOTOR

CROSS-REFERENCE TO RELATED APPLICATIONS

This application claims the benefit of U.S. Provisional Application No. 62/307,130 filed Mar. 11, 2016.

TECHNICAL FIELD

The field to which the disclosure generally relates to includes clutch and electric motor combinations.

BACKGROUND

Vehicles may include arrangements including one or more clutches, and an electric motor.

SUMMARY OF ILLUSTRATIVE VARIATIONS

A number of variations may include a product including a stator assembly and/or a rotor assembly wherein at least one of the stator assembly and/or rotor assembly includes a central cavity, and at least two clutch assemblies, wherein at least a portion of each of the two clutch assemblies is received in the cavity.

A number of variations may include a module wherein a plurality of clutches and electric motor are received in the same housing.

A number of variations may include two or more clutches inside of a rotor assembly.

A number of variations may include two or more clutches inside the rotor assembly with the clutches having the same outer and/or inner diameter.

A number of variations may include an assembly wherein at least a portion of two or more clutches and rotor laminations are mounted to a common component.

A number of variations may include an assembly wherein at least a portion of two or more clutches and rotor laminations are mounted to a common component, and wherein the common component is supported, directly or indirectly, on one end of a bearing assembly and the other end supported by an additional clutch. In a number of variations both ends of the rotor laminations may be supported by bearing assemblies. In a number of variations at least one of the bearings are needle bearings on a non-rotating support.

A number of variations may include a product including a cooling system in an electric motor and clutch module, wherein the cooling system involves supplying a flow of cooling/lubrication oil to clutch components, and then to a rotor assembly and/or stator assembly to extract heat from the motor and the clutch assembly components, and wherein the cooling system may be a part of the transmission oil circuit.

A number of variations may include a cooling system in a motor and clutch module, wherein the cooling system supplies a flow of cooling/lubrication oil to clutch components, and then to a rotor assembly and/or stator assembly to extract heat from the motor and the clutch assembly components, wherein the cooling system may be independent of the transmission oil circuit.

A number of variations may include a module containing an electric motor and multiple clutches, the oil used to actuate the first clutch passes between an inner shaft, an outer shaft, and through a support seal cover assembly.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

A number of variations may include a product including a stator assembly and/or a rotor assembly wherein at least one of the stator assembly and/or rotor/magnet assembly includes a central cavity, and at least two clutch assemblies, wherein at least a portion of each of the two clutch assemblies is received in the cavity.

A number of variations may include a module wherein a plurality of clutches and electric motor are received in the same housing.

A number of variations may include two or more clutches inside of a rotor assembly.

A number of variations may include two or more clutches inside the rotor assembly with the clutches having the same outer and/or inner diameter.

A number of variations may include an assembly wherein at least a portion of two or more clutches and rotor laminations are mounted to a common component.

A number of variations may include an assembly wherein at least a portion of two or more clutches and rotor laminations are mounted to a common component, and wherein the common component is supported, directly or indirectly, on one end of a bearing assembly and the other end supported by an additional clutch. In a number of variations both ends of the rotor laminations may be supported by bearing assemblies. In a number of variations at least one of the bearings are needle bearings on a non-rotating support.

A number of variations may include a product including a cooling system in an electric motor and clutch module, wherein the cooling system involves supplying a flow of cooling/lubrication oil to clutch components, and then to a rotor assembly and/or stator assembly to extract heat from the motor and the clutch assembly components, and wherein the cooling system may be a part of the transmission oil circuit.

A number of variations may include a cooling system in a motor and clutch module, wherein the cooling system supplies a flow of cooling/lubrication oil to clutch components, and then to a rotor assembly and/or stator assembly to extract heat from the motor and the clutch assembly components, wherein the cooling system may be independent of the transmission oil circuit.

A number of variations may include a module containing an electric motor and multiple clutches, the oil used to actuate the first clutch passes between an inner shaft, an outer shaft, and through a support seal cover assembly.

Figure 1:
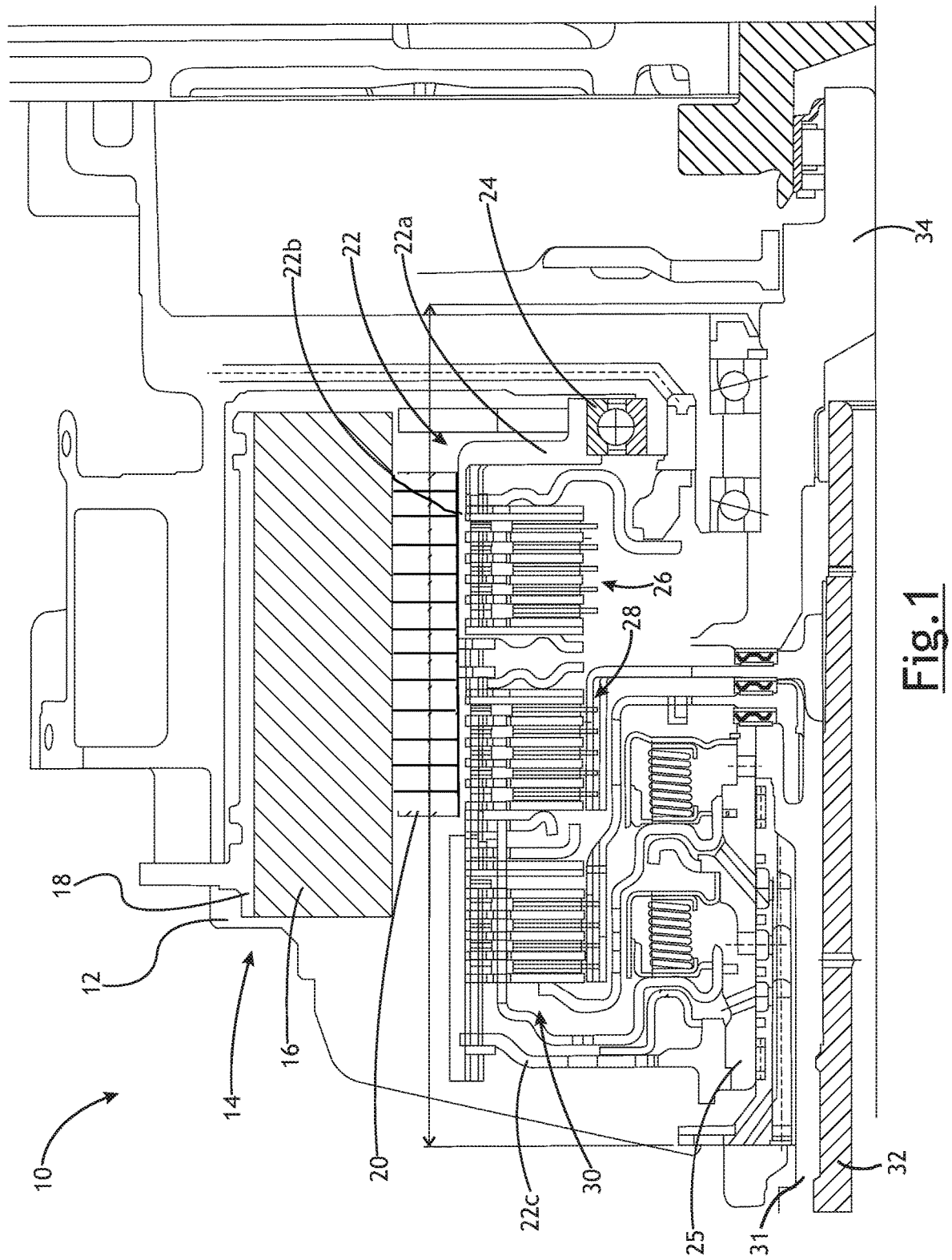
FIG. 1 is a cross-section illustrating a plurality of clutches which may be aligned on the same axis and an electric motor according to a number of variations.
Figure 2:
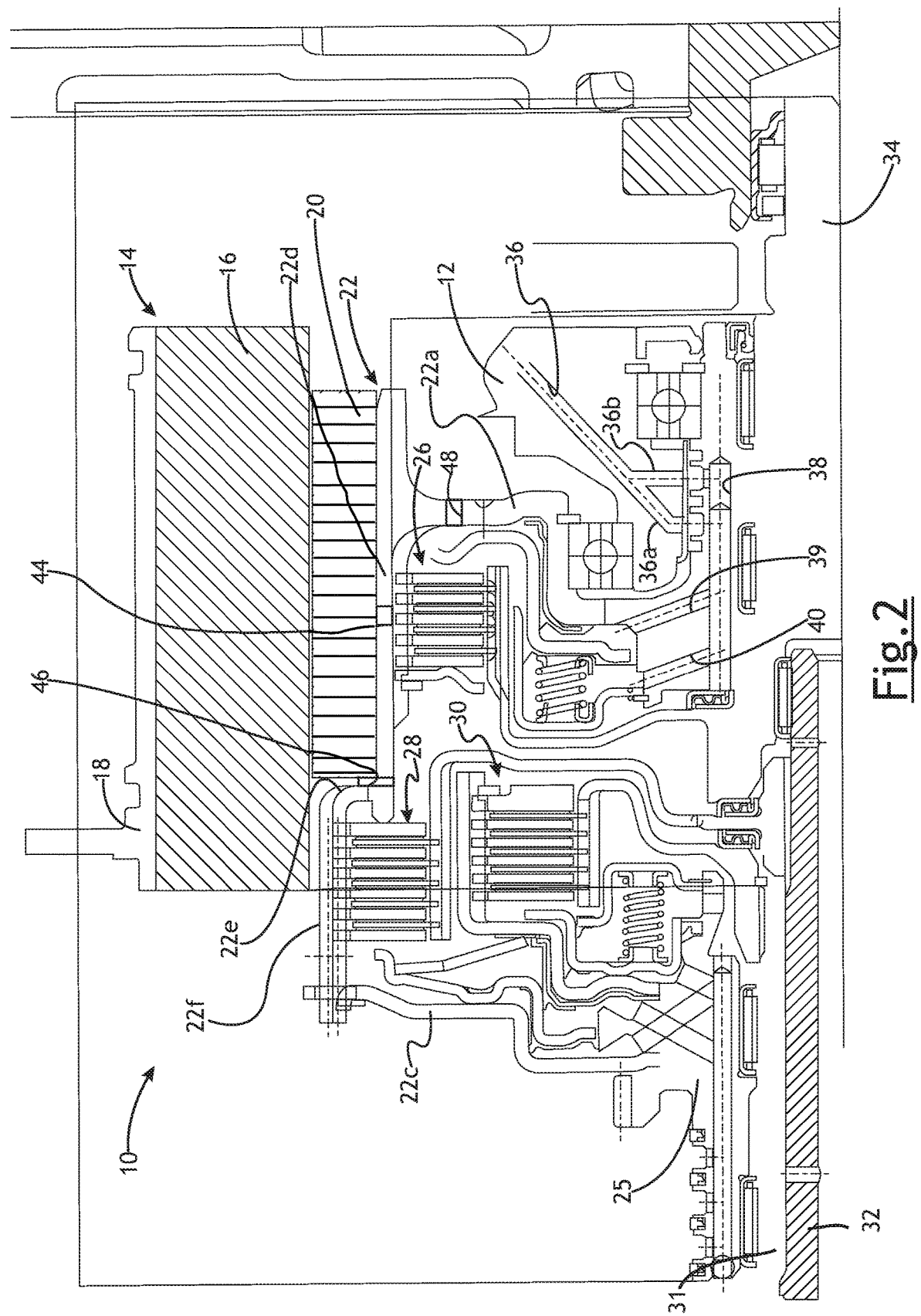
FIG. 2 illustrates a product including a plurality of clutches and an electric motor according to a number of variations.
Figure 3:
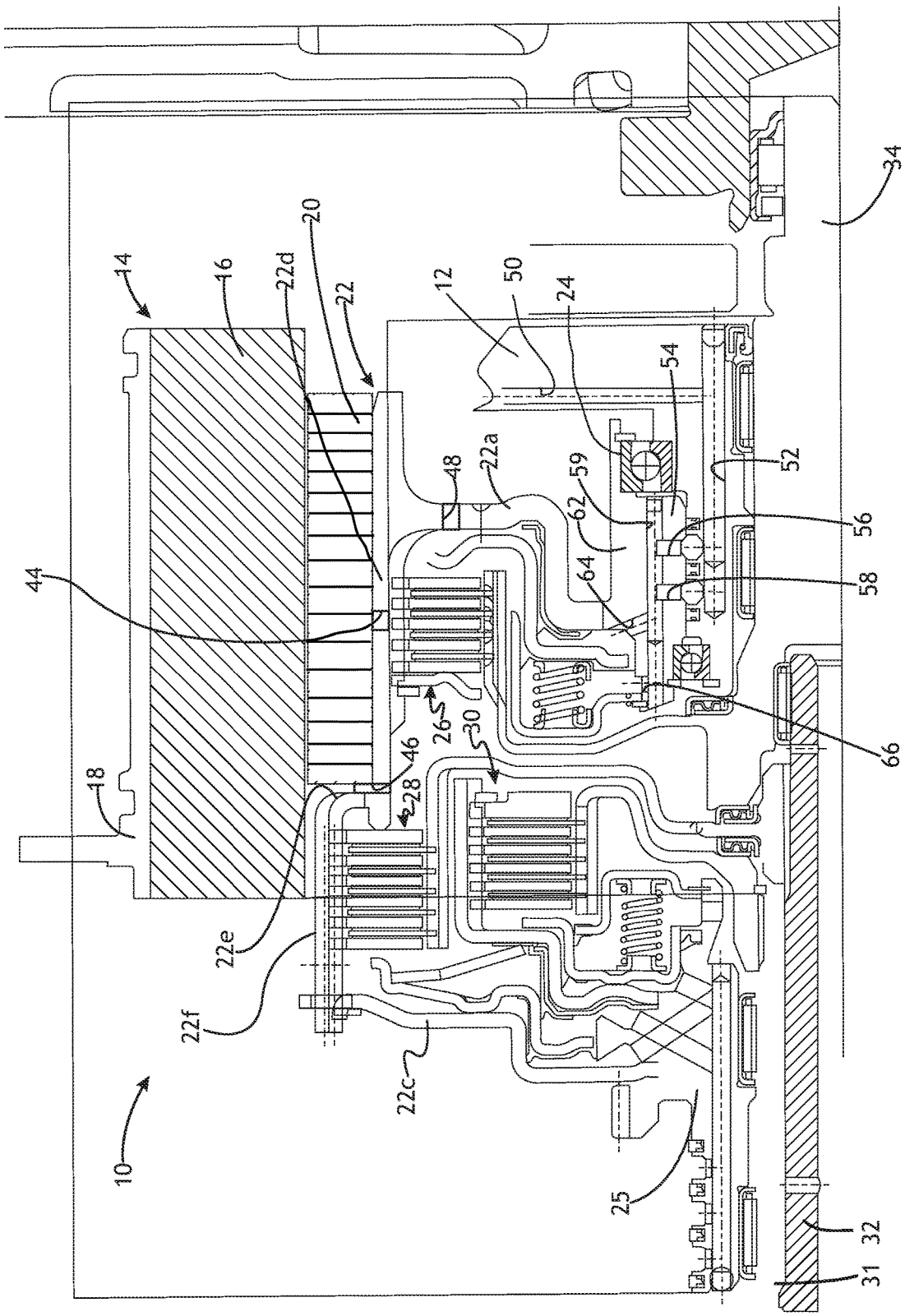
FIG. 3 illustrates a cross-section of a product including a plurality of clutches and an electric motor assembly according to a number of variations.

Referring now to FIGS. 1-3, a product 10 may include, in some select variations, a housing 12 which may carry a stator assembly 14 including a stator 16 and a stator sleeve 18. A rotor assembly 20 may be provided in a central cavity defined by the stator 16. Any of a number of types of rotors may be utilized including, but not limited to, magnetic, induction, switched reluctance, variable reluctance rotors and the like. A clutch carrier/rotor hub 22 may be provided and may include a first portion 22a connected to a bearing assembly 24. In a number of variations 22a may be positioned anywhere amongst the clutches to provide support of the clutches and/or rotor assembly. For example, one or more clutches may be positioned to the right or left of 22a. A second portion 22b may extend generally horizontally from the first portion 22a and may have attached thereto at least two, or two or more clutch assemblies, for example, clutch assemblies 26, 28, 30 (e.g. K0,K1,K2, respectively). A third portion 22c may extend downwardly from the second portion 22b. The third portion 22c may be connected to rotating member 25. The rotator assembly 20 may also be secured to the clutch carrier/rotor hub 22, for example, along the second portion 22b. A first output 31 or second output 32 may be provided and connected to an outer transmission input shaft and on the other side an input 34 may be provided and operatively connected to an engine.

The clutch carrier/rotor hub may be constructed of materials such as steel, iron, aluminum, titanium, composites, and the like.

Variations in which a housing 12 is provided, the combination of an electric motor including the stator assembly and rotor assembly having a plurality of clutches also received in the housing may be assembled and tested prior to being connected to a transmission system by an original equipment manufacturer or other supplier.

The arrangement of the clutch carrier/rotor hub may be constructed and arranged to provide robust support of the plurality clutch assemblies 26, 28, 30 within the housing. As will be appreciated from FIG. 1, for example, at least a portion of first and second clutch assemblies 26, 28 may be received within a cavity defined by the rotor assembly 20 and/or the stator 16. In the case of FIG. 1 a portion of at least each of the first clutch assembly 26, second clutch assembly 28, and third clutch assembly 30 are received in the cavity defined by the stator 16.

Referring now to FIG. 2, in a number of variations at least a first oil passage 36 may be provided in the housing 12 In a number of variations separate oil passages may be provided to separately deliver oil (1) for the clutches and the stator 16 and/or rotor assembly 20, and (2) high pressure oil to activate the clutches. In a number of variations, an oil passage for operating the clutches 26, 28, 30 may travel through passages such as passages 36a, 38 and 40 to activate the clutches. Lubrication oil may be provided and may travel for example through passages 36b and passage 38 (or similar passage) and passage 39 to lubricate the clutches 26, 28, 30. One or more passages 44, 46, and/or 48 may be provided in the clutch carrier/rotor hub 22 to allow the flow of oil to either or both ends of the stator 16, or either or both ends of the rotor assembly 20. In a number of variations, an oil passage 44 may be provided to flow oil under the rotor assembly 20 which may include one or more grooves (not shown) formed therein to flow the oil to one or both ends of the rotor assembly 20.

As shown in FIG. 2, the clutch carrier/rotor hub 22 may include a generally horizontal portion 22d that extends from 22a. Portion 22d carries the first clutch 26 and the rotor assembly 20. A generally vertical portion 22e extends from 22d and connects to another generally horizontal portion 22f that carries the second clutch 28. This horizontal portion 22f connects to a downward extending portion 22c that is connected to the rotating member 25.

Referring now to FIG. 3, the housing 12 may include an oil passage 50, which in one variation may extend radially to a bore 52 extending in the axially direction of the housing 12. An inner shaft 54 and an outer shaft 62 may be provided. One of passage 56 or passage 58 may extend from the passage 52 through the inner shaft 54 to an axial passage 59 existing between the inner shaft 54 and the outer shaft 62. The other of passage 56 or passage 58 may extend from the passage similar to 52 (but not shown) through the inner shaft 54 to an axial passage 59 existing between the inner shaft 54 and the outer shaft 62. A passage 64 may extend from passage 58 and provide lubricating oil to the clutches 26, 28, 30. A passage 66 may extend from passage 58 and provide high pressure oil to activate the clutches. Similar to that shown in FIG. 2, a plurality of passages 44, 46, and 48 may be provided through the clutch carrier/rotor hub 22 as desired to provide cooling oil to the stator 16 and/or rotor assembly. In a number of variations a variety of torque transfer paths can exist depending upon the actuation of the clutches. Such paths may include one or more of the following:

1. Torque from combustion engine to E-engine and to transmission
2. Torque from combustion engine to E-engine
3. Torque from combustion engine to transmission
4. Torque from combustion engine and E-engine to transmission
5. Torque from E-engine to combustion engine
6. Torque from E-engine to transmission
7. Torque from E-engine to combustion engine and transmission
8. Torque from E-engine and transmission to combustion engine
9. Torque from transmission to combustion engine
10. Torque from transmission to E-engine
11. Torque from transmission to E-engine and combustion engine
12. Torque from transmission and combustion engine to E-engine complete disconnection of transmission and engines The above description of select variations within the scope of the invention is merely illustrative in nature and, thus, variations or variants thereof are not to be regarded as a departure from the spirit and scope of the invention.

What is claimed is:
1. A product comprising: including
   a rotor assembly including a rotor hub having a first horizontal portion having an outer surface and an inner surface and a second horizontal portion having an outer surface portion and an inner surface portion radially offset from the first horizontal portion by a vertical portion the inner surface and the inner surface portion defining, at least in part, a central cavity, a plurality of rotor laminations mounted to the outer surface of the first horizontal portion; and at least two clutch assemblies arranged in the central cavity, a first of the at least two clutch assemblies being mounted to the inner surface of the first horizontal portion and a second of the at least two clutch assemblies being mounted to the inner surface portion of the second horizontal portion, wherein the rotor hub is supported at one end by a bearing assembly and is supported at another end by one of a third clutch assembly and a second bearing assembly.

2. The product as set forth in claim 1 further comprising a cooling system, wherein the cooling system provides a flow of cooling/lubrication oil to at least one of the two clutch assemblies, and then to the rotor assembly to extract heat wherein the cooling system is part of a transmission oil circuit.

3. The product as set forth in claim 1 further comprising a cooling system, wherein the cooling system supplies a flow of cooling/lubrication oil to at least one of the two clutch assemblies, and then to the rotor assembly to extract heat, wherein the cooling system is independent of the transmission oil circuit.

4. The product as set forth in claim 1, further comprising: an oil path for delivering oil to actuate the first clutch of the two clutch assemblies and includes a passage between an inner shaft, and an outer shaft.

* * * * *